United States Patent [19]

Francis

[11] 4,174,062
[45] Nov. 13, 1979

[54] WELDING ROD HOLDER ACCESSORY

[76] Inventor: Lawrence E. Francis, R.R. #2, Spencerville, Ontario, Canada, K0E 1X0

[21] Appl. No.: 874,050

[22] Filed: Feb. 1, 1978

[51] Int. Cl.² .......................... B23K 37/00; B23K 9/32
[52] U.S. Cl. ....................................... 228/19; 228/57; 219/70; 219/144; 15/105
[58] Field of Search ............... 219/138, 139, 140, 141, 219/142, 143, 144, 70; 228/19, 57; 30/168; 7/145, 158; 15/111, 105

[56] References Cited

U.S. PATENT DOCUMENTS

| | | | |
|---|---|---|---|
| 2,395,214 | 2/1946 | Bourque | 15/111 X |
| 2,428,138 | 9/1947 | Blakemore | 219/138 |
| 2,540,204 | 2/1951 | Holslag | 219/141 |
| 2,870,324 | 1/1959 | Albert | 219/143 |
| 2,885,535 | 5/1959 | Forseth | 219/143 |
| 3,493,719 | 2/1970 | Cribb | 219/142 |
| 3,739,140 | 6/1973 | Rotilio | 219/144 |

Primary Examiner—Francis S. Husar
Assistant Examiner—Kenneth J. Ramsey
Attorney, Agent, or Firm—Daniel Jay Tick

[57] ABSTRACT

A chipper head is removably affixed to the holder head of a welding rod holder in an area spaced from and opposite the point of support of a welding rod whereby the welding rod holder functions as a combination welding rod holder and chipper hammer.

1 Claim, 5 Drawing Figures

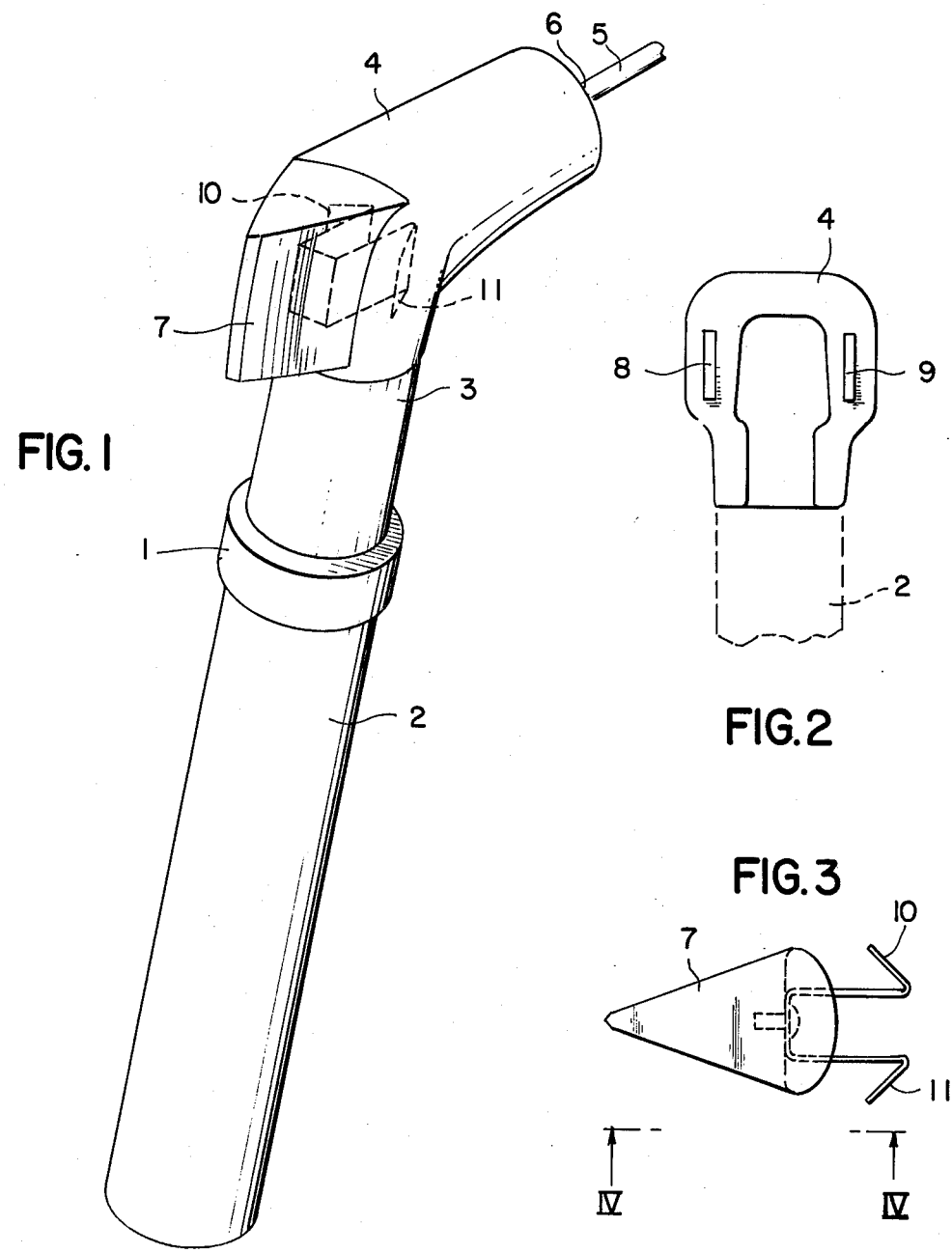
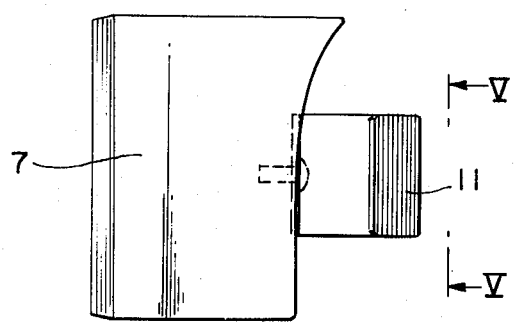
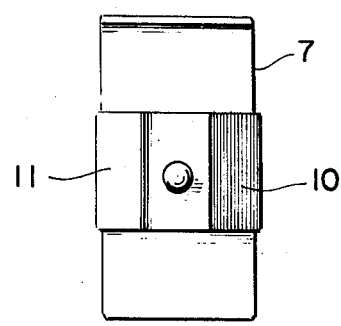

WELDING ROD HOLDER ACCESSORY

BACKGROUND OF THE INVENTION

The present invention relates to a welding rod holder accessory. More particularly, the invention relates to a welding rod holder accessory for a welding rod holder having a handle with a free end and a holder head at the free end of the handle for supporting a welding rod at a predetermined point thereof.

Objects of the invention are to provide a welding rod holder accessory of simple structure, which is inexpensive in manufacture, installed with facility and convenience, used with facility, convenience and safety, and functions efficiently, effectively and reliably to combine a chipper head with a welding rod holder thereby eliminating the necessity for a separate chipper head for removing flux after a welding operation, and protecting the holder from wear and tear which would be caused were the holder to be used to batter at the weld in an effort to clean it.

BRIEF DESCRIPTION OF THE DRAWINGS

In order that the invention may be readily carried into effect, it will now be described with reference to the accompanying drawings, wherein:

FIG. 1 is a perspective view of an embodiment of the welding rod holder accessory of the invention, affixed to a welding rod holder;

FIG. 2 is a view of the holder head of a welding rod holder to which the welding rod holder accessory of the invention is affixable;

FIG. 3 is a view of an embodiment of the welding rod holder accessory of the invention;

FIG. 4 is a view, taken along the lines IV—IV, of FIG. 3; and

FIG. 5 is a view, taken along the lines V—V, of FIG. 4.

DETAILED DESCRIPTION OF THE INVENTION

The welding rod holder accessory of the invention is for a welding rod holder 1 having a handle 2 with a free end 3 and a holder head 4 at the free end of said handle, as shown in FIG. 1. The holder head 4 supports a welding rod 5 at a predetermined point 6 thereof (FIG. 1).

A chipper head 7 (FIGS. 1, 3, 4 and 5) is removably affixed to the holder head 4 in an area thereof spaced from and opposite the predetermined point 6 thereof at which the welding rod 5 is supported. The welding rod holder 1 thus functions as a combination welding rod holder and chipper hammer and thereby avoids the need for a separate chipper hammer.

A fastening device removably affixes the chipper head 7 to the holder head 4. The fastening device comprises a pair of spaced slots 8 and 9 formed in the holder head 4, as shown in FIG. 2, and a pair of spaced resilient clamp members 10 and 11 (FIGS. 1, 3 and 5) affixed to, and extending from, the chipper head 7. The clamp members 10 and 11 are removably clamped in the slots 8 and 9, as shown in FIG. 1.

While the invention has been described by means of a specific example and in a specific embodiment, I do not wish to be limited thereto, for obvious modifications will occur to those skilled in the art without departing from the spirit and scope of the invention.

I claim:

1. A combination welding rod holder and a chipper head, said welding rod holder having a handle with a free end and a holder head at the free end of the handle for supporting a welding rod at a predetermined point thereof, said combination welding rod holder and chipper head comprising a chipper head removably affixed to the holder head in an area thereof spaced from and opposite the predetermined point thereof at which the welding rod is supported; and fastening means for removably affixing the chipper head to the holder head whereby said welding rod holder functions as a combination welding rod holder and chipper hammer, said fastening means comprising a pair of spaced slots formed in the holder head and a pair of spaced resilient clamp members affixed to and extending from the chipper head, said clamp members being removably clamped in said slots.

* * * * *